Jan. 31, 1967  R. H. BRANDT ETAL  3,301,128
PROJECTOR APPARATUS

Filed Nov. 4, 1963  3 Sheets-Sheet 1

INVENTORS
RALPH H. BRANDT
JOHN P. SCHOENTGEN
BY Fulwider, Patton, Rieber
Lee, and Utecht
ATTORNEYS Jan. 31, 1967   R. H. BRANDT ETAL   3,301,128
PROJECTOR APPARATUS
Filed Nov. 4, 1963   3 Sheets-Sheet 2
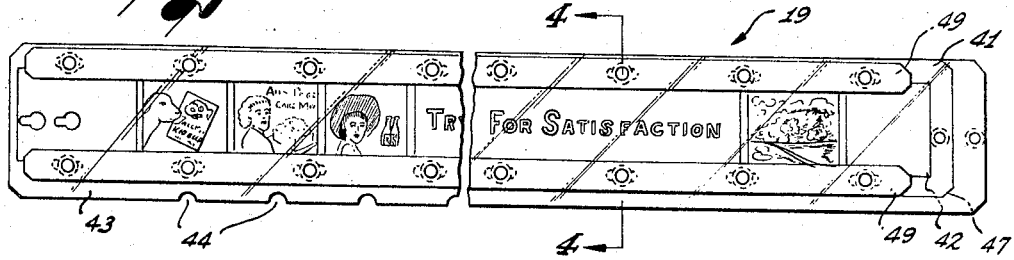
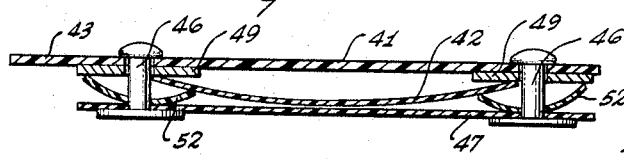
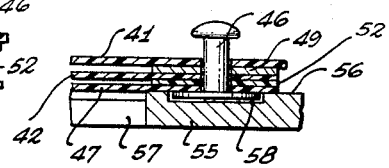
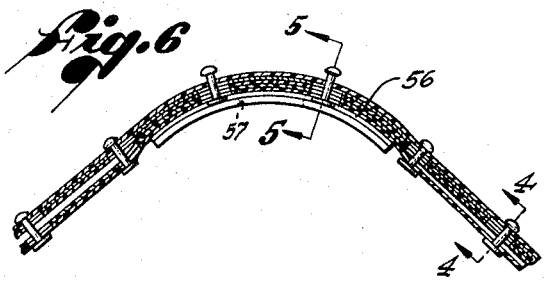
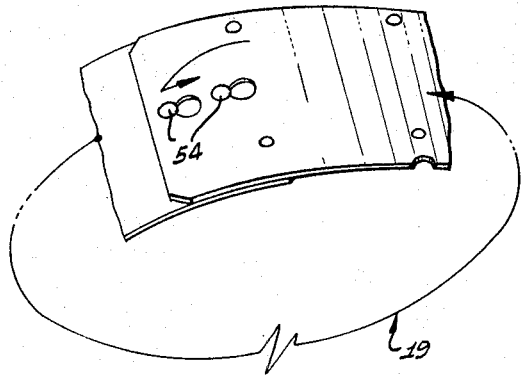
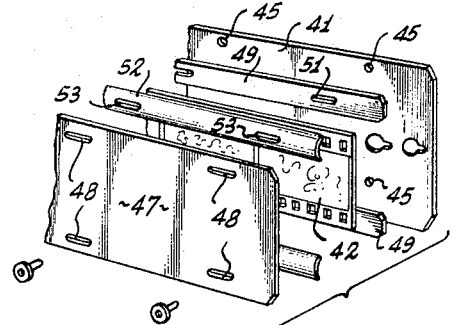
INVENTORS
RALPH H. BRANDT
JOHN P. SCHOENTGEN
BY Zulwider, Patton, Rieber,
Lee, and Utecht
ATTORNEYS

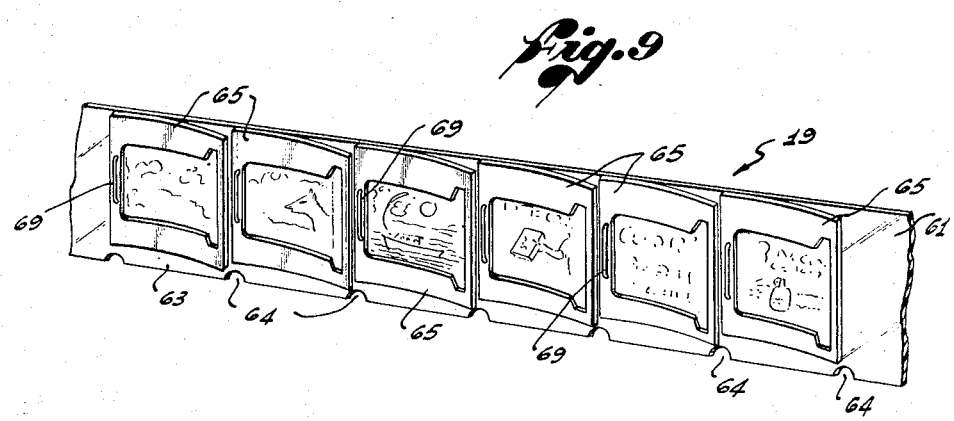
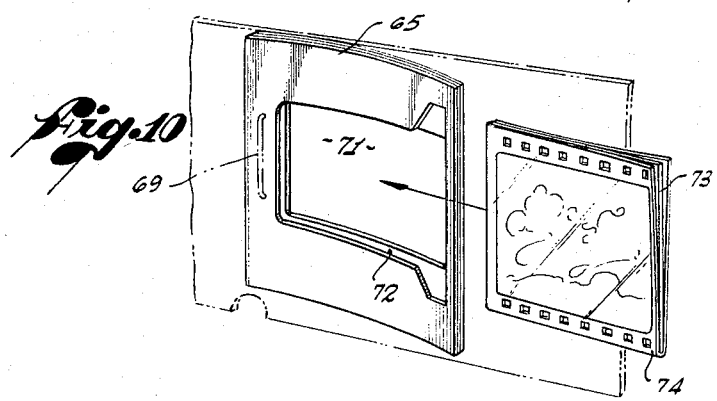
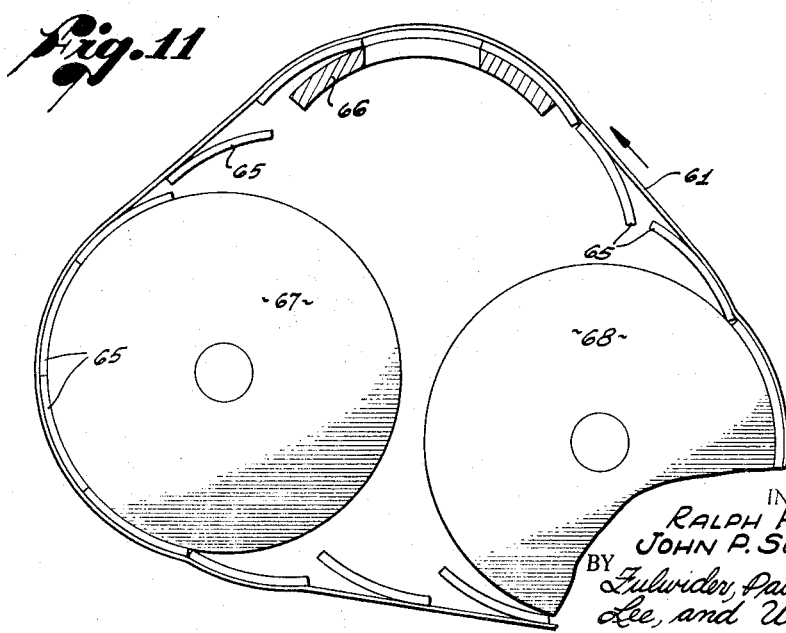

United States Patent Office 3,301,128
Patented Jan. 31, 1967

3,301,128
PROJECTOR APPARATUS
Ralph H. Brandt, 123 Columbia St., Pasadena, Calif. 91105, and John P. Schoentgen, 390 S. Grand Ave., Pasadena, Calif. 91103
Filed Nov. 4, 1963, Ser. No. 320,992
12 Claims. (Cl. 88—28)

The present invention relates generally to apparatus for projecting images from film transparencies in the form of film strip or mounted slides, and more particularly, to apparatus combining a projector and a screen in a unitary device for displaying to view on the screen the images contained on the film strip or slides.

Projector and screen combinations for displaying the images recorded on film transparencies provide a convenient, dependable and inexpensive medium for advertising, teaching, entertaining and other communication purposes. These combinations may be of any desired size and can readily be compacted for housing in a portable cabinet.

Many difficulties have heretofore been encountered in the operation of such combinations, among which may be cited: loss of sharp focus due to the film "popping" or distorting from contraction of its emulsion surfaces under the heat of the projection lamp; the film strip sticking in pressure type gates due to heat build-up in the pressure plates; scratches and smudges occurring on the surfaces of the film and slide transparencies; jams and incorrect location of mounted slides; and various other difficulties.

According to the present invention, the film, both in the form of a strip and as an individual slide, has the portion being projected curved in one plane so that it cannot curl or distort out of focus due to projection lamp heat. This is accomplished in the illustrated embodiment by supporting the film against a curved gate whose surface is curved in the direction of travel of the film strip and slides. This gives mechanical strength and stability to the film and prevents it distorting or "popping" out of focus. As the film is curved during projection, the screen upon which the image is displayed is given a complementary curvature so that the screen and the film are optically concentric and all corresponding image points on the screen and film will be equally distant. Such complementary film (gate) and screen curvature permits the use of inexpensive, partially uncorrected projection lenses.

In addition to the permanent focus secured through the curvature of the film in one plane, whereby its mechanical position becomes insensitive to long exposure to heat, the film strip and slides are preferably covered with optically clear, strong, plastic sheet material to prevent scratches, smudges and other marks on the film surfaces. In one form of the invention the film strip and mounted slides are supported on endless belt loops which may be continuously or intermittently motor driven to provide for the projection and display of the film images in succession, for long periods of time without attention, and at very low operating costs. Such belts are preferably formed of optically clear, tough, and flexible material, such as that sold under the trademark Mylar, and the protective covering for the film surfaces may be of thinner sheets of the same material.

It is therefore a primary object of the present invention to provide means for projecting film transparencies in strip and slide form automatically, in continuous or intermittent manner, for long periods of time at low cost.

Another object of this invention is the provision of a projector for film transparencies which shall remain in constant focus without the use of pressure plates, regardless of the heating of the film by the projection lamp.

Another object of this invention is the provision of an improved projection apparatus having means for maintaining the film being projected in focus by curving it in one plane during projection, and having an optically concentric, curved viewing screen providing for linear motion of the projected image points as they move across the screen with the movement of the film in the direction of its curvature.

A further object of this invention is an improved slide mounting for film transparencies for maintaining their physical position against distortion due to projection lamp heat.

A still further object of the invention is an improved protective mounting for film transparencies providing for extended use thereof without structural or surface wear or damage.

Yet another object of this invention is the provision of an improved continuous loop belt mounting for film strips and slide mounts.

These and other objects and features of the invention will be readily apparent to those skilled in the art from the following specification and the appended drawing, in which:

FIGURE 3 is a flattened view of a belt mounting for a film strip according to the present invention;

FIGURE 4 is an enlarged transverse sectional view on the line 4—4 of FIGURE 3;

FIGURE 5 is a partial detail sectional view on the line 5—5 of FIGURE 6;

FIGURE 6 is a longitudinal sectional view through the belt mounting of FIGURE 3 at it passes around a curved gate;

FIGURE 7 shows the connection of the ends of the belt of FIGURE 3 into a continuous loop;

FIGURE 8 is an expanded perspective view of the elements of the belt mounting of FIGURE 3;

FIGURE 9 is a partial view of a belt mounting for slide mounts according to the present invention;

FIGURE 10 is an enlarged view of a curved slide mount showing the manner of inserting a film slide or frame therein; and FIGURE 11 is a diagrammatic representation of the operation of the belt of FIGURE 9 in a continuous loop across a curved projection gate.

Figure 1:
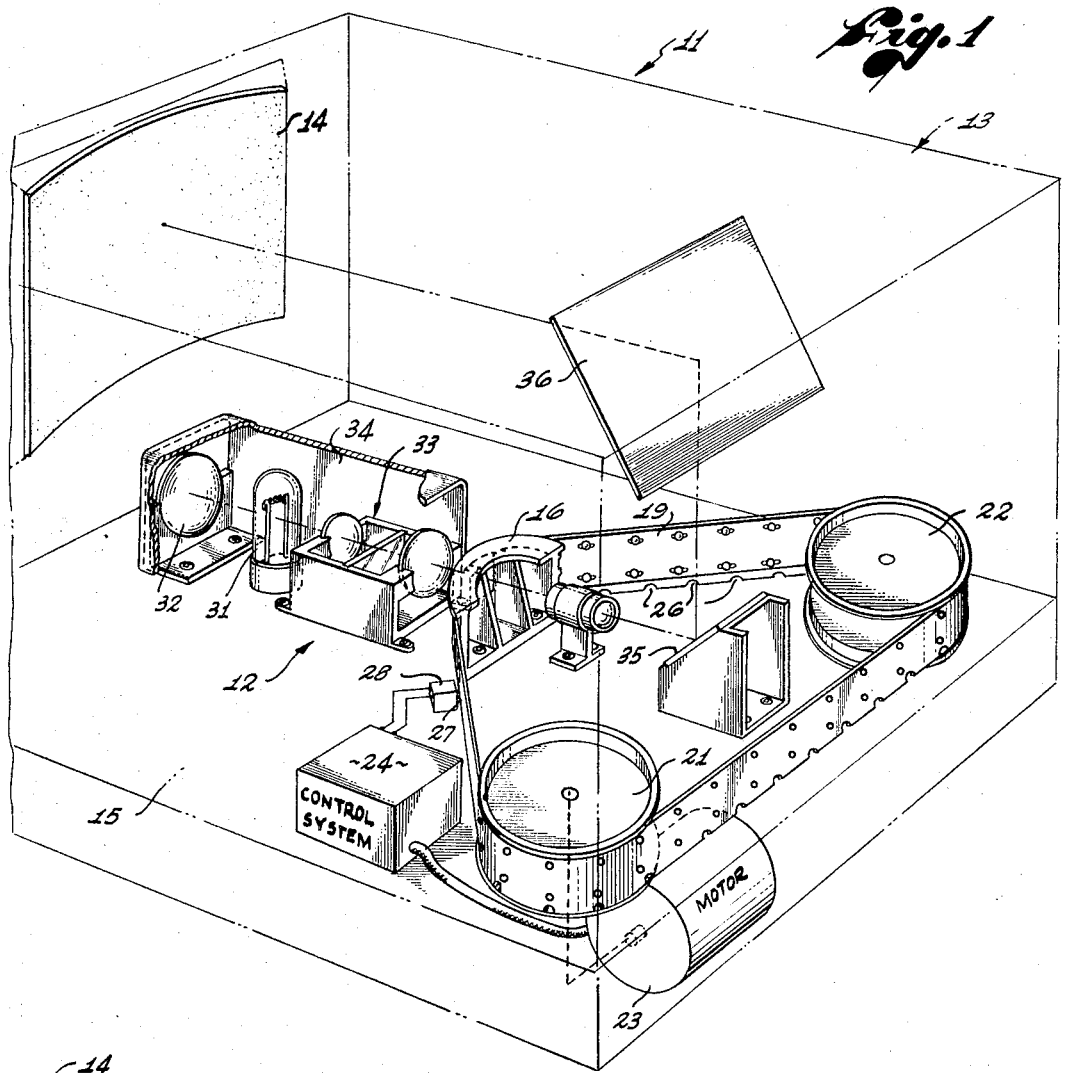
FIGURE 1 is a diagrammatic, perspective view of a projector and screen combination according to the present invention.
Figure 2:
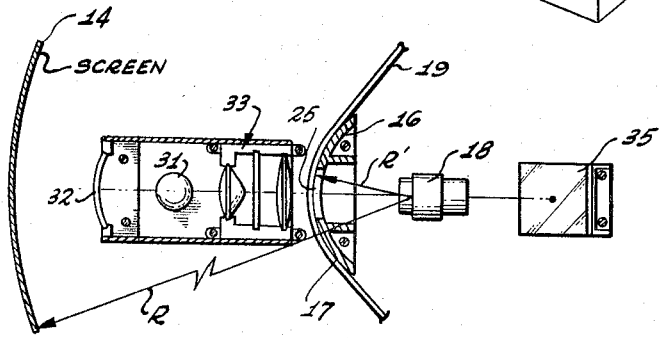
FIGURE 2 is a diagrammatic plan view of an optical portion of the projector.

The projector and screen combination of FIGURES 1 and 2, indicated generally by the numeral 11, has a projector portion 12 supported within a phantom cabinet 13, in the front wall of which is mounted a projection screen 14. The cabinet 13 includes a supporting platform 15 on which is mounted a projection gate 16 having a curved outer surface 17 with a radius R' of, for example, two and one-half inches, to the effective center of a projection lens 18. The lens 18 may be of conventional construction, a low cost, partially corrective assembly of individual lens elements. The gate 16 has a projection opening 25 therethrough and is desirably formed of a material having a low coefficient of friction, such as molded plastic of the types sold under the trademarks Delrin or nylon, so that the film shield and slide mounts will slide smoothly over the surface 17 thereof without substantial resistance or wear.

A film mounting belt 19 is illustrated in FIGURES 1 and 2 as passing around the gate 16 and two rotating drums 21 and 22. The drum 22 is freely rotatable on its mounting shaft as an idler, and the drum 21 is driven by an electric motor 23, either continuously or intermittently, through a control system 24. For intermittent operation the frames of the film strip and the individual slides may be stopped in the opening 25 in indexed relation thereto. The indexing control may be accomplished in any conventional manner, but is diagrammatically represented in FIGURE 1 by edged notches 26 in the belt 19 which cooperate with a follower 27 to effect operation of a switching means 28. The control system 24 is activated by switch 28 to selectively and for a timed interval stop the motor 23, actuate a clutch drive, or otherwise effect intermittent, indexed movement of the film mounting belt.

Also mounted on the cabinet platform 15 is a projection lamp 31, a back reflector 32 and a condenser 33 including, as illustrated in FIGURE 2, an aspherical lens toward the lamp 31, an intermediate heat shield plate, and a double convex lens toward the gate opening 25. A light shield 34 encloses the illuminating system. Light from the lamp 31 passes through the condenser lens system 33, the film transparency, and the opening 25 to the projection lens system 18. A primary reflecting mirror 35 is mounted on the platform 15 in line with the projection lens 18. Above the primary mirror 35 is a secondary reflecting mirror 36 supported in the cabinet 13 in line with the back surface of the curved screen 14.

The screen 14 is translucent for viewing from in front an image projected on its back surface and may be formed, for example, with a ground glass rear surface, or of known plastic materials and structure. As shown in FIGURE 2, the screen 14 is curved to be optically concentric with the surface 17 of the gate 16, having an effective radius of curvature R about the same center as the radius R' of the gate surface 17. The showing of FIGURE 2 is representative only, as suggested by the jagged portion of the radius line R, since this radius will actually include the entire optical path from the projection lens through the primary and secondary mirrors to the screen.

By making the gate surface 17 curved in the direction of movement of the film mounting belt 19 and the radius of curvature of the back face of the screen 14 optically substantially concentric with the gate surface, all image points on the film are substantially equidistant from the corresponding image points on the screen in the long dimension. Therefore, as the film moves across the gate opening 25, image points projected on the screen will have substantially linear movement across the screen from side to side. This obviates need for full flat-field correction in the projection lens and a simple, low cost lens may be used while securing a sharp image over substantially all parts of the screen. If a flat planar screen were used instead of the optically concentric screen 14, a projection lens having full flat-field correction would be required to produce sharpness over all parts of the screen and linearize image point movement, and such a correcting lens would be very expensive.

With the curved surface 17 of gate 16, the film is given a curve in its plane of movement which makes it structurally stable so that it will not "pop" or distort due to projection lamp heat. A permanent, sharp focus is thereby given to the projected image which will not change as the film becomes heated. This construction also does away with the need for glass pressure plates or other means for maintaining the film against distortion which might otherwise require refocusing after a film frame or slide is introduced into the gate opening and its temperature rises.

FIGURES 3 through 8 illustrate one form of belt mounting for a continuous film strip to form the endless belt 19. The supporting belt comprises an optically clear, tough, flexible, main supporting strip 41 of, for example, Mylar. This main belt strip is substantially wider than the film strip 42, being provided with an extended edge 43 in which may be cut control notches 44. Adjacent to its opposite edges the strip 41 is provided with rows of holes 45 in which are mounted studs 46. The film strip 42 is mounted freely between the longitudinally extending rows of studs 46 and is backed by a thin shield strip 47 having longitudinally extending slots 48 therein receiving the shanks of the studs 46.

Against the inner face of the belt strip 41 are disposed a pair of elongated, flat spacer strips 49 having slots 51 therethrough receiving the shanks of the studs 46. The spacer strips 49 are thereby disposed between the edges of film strip 42 and the belt strip 41. A pair of longitudinally extending spacer strips 52 are disposed between the edges of film strip 42 and the shield strip 47 and have longitudinally extending slots 53 therein receiving the shanks of the studs 46. The spacer strips 52 are transversely curved, as shown in FIGURES 4 and 8, and may likewise be formed of Mylar which has been given a permanent set under heat. The spacing strips 52 are resilient and tend to return to their curved form to move the shield strip 47 away from the belt strip 41, as shown in FIGURE 4, to permit the film strip 42 to be suspended substantially out of contact with both the belt and the shield strips. The ends of the belt strip 41 may be connected together in releasable fashion by studs 54 passing through holes in one end of the belt strip and key hole slots in the other end of the strip, as shown in FIGURE 7, to thereby form a continuous loop belt 19 as in FIGURES 1 and 2.

The operation of the mounting belt of FIGURES 3 and 4 in passing over a curved gate surface is shown in FIGURES 5 and 6 wherein such a gate is shown at 55 having a curved surface 56 and a gate opening 57. The gate surface 56 may be provided with spaced grooves 58, above and below the opening 57, to receive the inner heads on the studs 46. In passing over the curved gate surface 56, the belt strip 41 presses against the other parts of the mounting to compress the curved spacer strips 52 into a substantially flat configuration, as shown in FIGURES 5 and 6. The opposite edges of the shield strip 47 are thereby pressed against the surface 56, through the spacers 52, the film strip 42 and the spacers 49, by the belt strip 41. Free space between the strips 41 and 47 is still provided for the film strip 52 so that there is no pressure engagement with either the emulsion or the opposite surface thereof.

As a belt 19 in the form of FIGURES 3–8 passes over the gate 16 and the drums 21, 22, of FIGURE 1, the shield strip 47 will be curved to a smaller radius than the belt strip 41, with the spacer strips 52, the film strip 42 and the spacer strips 49 in progressively increasing radii between the strip 47 and the strip 41. The strips on the belt will therefore be moving at different speeds while curved, because of their different radii, and there will be relative movement therebetween. The studs 46 are held stationary relative to the belt strip 41 by holes 45, but the slots 48, 53 and 51 will permit relative longitudinal movements of the strips 47, 42 and 49 relative to each other and belt strip 41. Likewise, the film strip 42, which is retained only at one end, is free to make necessary longitudinal adjustments relative to the supporting belt strip.

It is therefore seen that the mounting of FIGURES 3 through 8 suspends the film strip 42 freely between the belt strip spacers 49 and the shield strip spacers 52, within the space provided between the belt strip 41 and the shield strip 47, so that no substantial force is exerted against the surfaces of the film strip and its emulsion is protected against scratching and smudging. The mounting further provides for relative longitudinal movement between the strip elements of the mounting as the belt moves around in curved and straight paths in its movement past the projection gate. It is further seen that the mounting supports a film strip on a heavy, tough, friction-driven belt to do away with wear on the film strip caused by sprocket drive and this, coupled with the protection of the film strip surfaces between the supporting belt and shield strips, provides for almost unlimited use of the film strip in the projector without deleterious effect on its physical structure or the optical image projected therefrom.

FIGURES 9 through 11 illustrate a construction of a continuous loop belt 19 for the projector of FIGURES 1 and 2 utilizing individual slide mounts for film transparencies. The slide mounts are supported on a belt strip 61 similar to the belt strip 41 but without the holes 45 therethrough. The belt strip 61 has an extended edge 63 in which are cut control notches 64 corresponding to the indexing notches 26 of FIGURE 1. Individual slide or film frame mounts 65 are supported on the belt 61 to be free to swing relative to the belt as the belt assumes a flat position between a curved projection gate 66 and drums 67 and 68, which correspond, respectively, to the projection gate 16 and the drums 21 and 22 of FIGURE 1. One manner of securing this swinging freedom is shown in the illustrated embodiment as a wire staple 69 passing through the mount 65 and the belt 61 adjacent the forward edge of the mount. Any similar attachment can be used which is preferably forward of the transverse center line of the mount.

The mounts 65 are transversely curved in their direction of motion in a permanent set, with a radius conforming to the radius of projection gate 66, for example, two and one-half inches. The slide mounts 65 may be formed of hard vulcanized fibre or any plastic material which may be given a permanent set. The mounts 65 have openings 71 therethrough surrounded by pockets 72 formed between spaced inner and outer walls in known manner. The film transparencies or frames 73 are disposed within thin Mylar or other optically clear plastic folders 74 with which they are mounted in the pockets 72 so that the films 73 are supported in the mounts 65 between protecting plastic sheets. The film assumes the curvature of the mounts 65 and is held to this curvature in the plane of travel of the mounts. The film is thereby held to a fixed physical position against distortion under the heat of the projection lamp, giving a fixed permanent focus to the image.

It will be understood that the strip mount of FIGURE 3 and the slide mount of FIGURE 9 may be readily combined on the same belt 19.

The term "film transparency," as used in this specification and in the following claims is to be construed to include, without limitation thereto, photographic film and plates and all materials, translucent or opaque, through or about which an image may be projected. The projection will obviously be through translucent material, through cuts and the like in opaque material, and about opaque outlines.

While certain preferred embodiments of the invention have been specifically illustrated and described, it will be understood that the invention is not limited thereto as many variations will be apparent to those skilled in the art, and the invention is to be given its broadest interpretation within the terms of the following claims.

We claim:

1. Projection apparatus comprising: a light source; a projection lens; a projection gate intermediate to and having an opening therethrough aligned with said lens and light source; means for supporting a film transparency against said gate in line with said opening to project the image thereon through said projection lens, the surface of said gate against which said film transparency is supported being curved in the direction of movement of the film, and said film conforming to said curvature to have physical stability against positional distortion under the heat of said light source; and a screen upon which the film image is projected, said screen having a curvature substantially optically concentric with the curvature of said gate surface so that points on the screen image are substantially equidistant from corresponding points on the image on the film.

2. Projection apparatus comprising: a light source; a projection lens; a projection gate having an opening therethrough aligned with said lens and light source; means for supporting a film transparency against said gate in line with said opening to project the image thereon through said projection lens; a surface of said gate against which said film transparency is supported being transversely curved to effect a transverse curvature in said film conforming thereto to make the film stable against distortion under the heat of said light source; and a screen upon which the film image is projected, said screen having a transverse curvature substantially optically concentric with the curvature of said gate surface so that points on the screen image are substantially equidistant from the corresponding points on the film image.

3. Projection apparatus comprising: a light source; a projection lens; a screen upon which a film image is to be projected; and means for supporting a film transparency in line with said light source and projection lens to project the image on the film onto the screen, said supporting means holding the film with a transverse curvature to make it physically stable against positional distortion under the heat of said light source, the surface of said screen having a transverse curvature which is substantially optically concentric with the curvature of said film so that points on the screen image are substantially equidistant from the corresponding points on the film image.

4. Projection apparatus comprising: a light source; a projection lens; a projection gate having an opening therethrough aligned with said lens and light source; a screen for receiving a projected image; means for moving a film transparency across said gate opening to project a moving image on the screen corresponding to the image on the film, the surface of said gate about said opening being curved in the direction of movement of said film, the film conforming to the gate curvature to have physical stability against positional distortion under the heat of said light source; and means for making the movement of the screen image linear including a surface on said screen receiving said projected image and having a curvature in the direction of image movement substantially optically concentric with the curvature of the gate so that points on the screen image are substantially equidistant from the corresponding points on the film image.

5. Projection apparatus comprising: a light source; a projection lens; a projection gate having an opening therethrough aligned with said lens and light source; means for supporting a film transparency against said gate to project the image thereon through said opening, the surface of said gate against which said film transparency is supported being curved in the direction of movement of the film, and said film conforming to said curvature to have physical stability against positional distortion under the heat of said light source; a screen upon which the film image is projected, said screen having a curvature substantially optically concentric with the curvature of said film so that points on the screen image are substantially equidistant from corresponding points on the film image, said film supporting means including a transparent supporting belt; means for moving said belt across said projection gate in front of the opening therethrough; and means for supporting film transparencies on said belt to move therewith.

6. Projection apparatus comprising: a light source; a projection lens; a projection gate having an opening therethrough aligned with said lens and light source; means for supporting a film transparency against said gate to project the image thereon through said opening, the surface of said gate against which said film transparency is supported being curved in the direction of movement of the film, and said film conforming to said curvature to have physical stability against positional distortion under the heat of said light source; a screen upon which the film image is projected, said screen having a curvature substantially optically concentric with the curvature of said gate surface so that points on the screen image are substantially equidistant from corresponding points on the film image, said film supporting means including a transparent endless supporting belt; means for moving said belt across said projection gate in front of the opening therethrough; and means for supporting film transparencies on said endless belt to move therewith, including a shielding strip mounted on said endless belt parallel thereto, means spacing said shielding strip from said belt, and a film strip mounted in the space between said belt and said shielding strip.

7. Projection apparatus comprising: a light source; a projection lens; a projection gate having an opening therethrough aligned with said lens and light source; means for supporting a film transparency against said gate to project the image thereon through said opening, the surface of said gate against which said film transparency is supported being curved in the direction of movement of the film, and said film conforming to said curvature to have physical stability against positional distortion under the heat of said light source; a screen upon which the film image is projected by said projection lens, said screen having a curvature substantially optically concentric with the curvature of said gate surface so that points on the screen image are substantially equidistant from corresponding points on the film image, said film supporting means including a transparent endless supporting belt; means for moving said belt across said projection gate in front of the opening therethrough; and means for supporting film transparencies on said endless belt to move therewith, including a shielding strip mounted on said endless belt parallel thereto, means spacing said shielding strip from said belt, a film strip mounted in the space between said belt and said shielding strip, and means providing for relative motion between said strips and said belt to accommodate differences in speed of movement thereof about a curved support.

8. Projection apparatus comprising: a light source; a projection lens; a projection gate having an opening therethrough aligned with said lens and light source; means for supporting a film transparency against said gate to project the image thereon through said opening, the surface of said gate against which said film transparency is supported being curved in the direction of movement of the film, and said film conforming to said curvature to have physical stability against positional distortion under the heat of said light source so that the focus of the film image remains fixed; a screen upon which the film image is projected said screen having a curvature substantially optically concentric with the curvature of said gate surface, said film supporting means including a transparent endless supporting belt; means for moving said belt across said projection gate in front of the opening therethrough; and means for supporting film transparencies on said endless belt to move therewith, including a shielding strip mounted on said endless belt and parallel thereto, means spacing said shielding strip from said belt, a film strip mounted in the space between said belt and said shielding strip, and means providing for relative motion between said strips and said belt to accommodate differences in speed of movement thereof about a curved support, said last mentioned means including studs mounted on the belt and connected to the shielding strip through longitudinally extending slots therethrough.

9. Projection apparatus comprising: a light source; a projection lens; a projection gate having an opening therethrough aligned with said lens and light source; means for supporting a film transparency against said gate to project the image thereon through said opening, the surface of said gate against which said film transparency is supported being curved in the direction of movement of the film, and said film conforming to said curvature to have physical stability against positional distortion under the heat of said light source; a screen upon which the film image is projected, said screen having a curvature substantially optically concentric with the curvature of said gate surface so that points on the screen image are substantially equidistant from corresponding points on the film image, said supporting means including an endless supporting belt; means for controllably moving said belt over said projection gate; a plurality of film slide mounts individually supported on said belt, said mounts having a permanent curvature longitudinally of the belt of substantially the same radius of curvature as the radius of curvature of the projection gate surface; and a film transparency mounted in each slide mount so as to take the curvature thereof.

10. Projection apparatus comprising: a light source; a projection lens; a projection gate having an opening therethrough aligned with said lens and light source; an optically clear endless supporting belt; means for controllably moving said belt over said projection gate; a plurality of film slide mounts individually supported on said belt, said mounts having a permanent curvature longitudinally of the belt; a film transparency mounted in each slide mount so as to take the curvature thereof to give the film physical stability against positional distortion under the heat of said light source; and a screen upon which the film image is projected, said screen having a curvature substantially optically concentric with the curvature of a slide mount and film in projection position.

11. Projection apparatus comprising: a light source; a projection lens; a projection gate having an opening therethrough aligned with said lens and light source; an optically clear endless supporting belt; means for controllably moving said belt over said projection gate; a plurality of film slide mounts individually supported on said belt forwardly of their transverse center lines so that the trailing edges of the mount are free to swing clear of the belt in the straight line movement thereof, said mounts having a permanent curvature longitudinally of the belt; a film transparency mounted in each slide mount so as to take the curvature thereof to give the film physical stability against positional distortion under the heat of said light source; and a screen upon which the film image is projected, said screen having a curvature substantially optically concentric with the curvature of a slide mount and film in projection position.

12. Projection apparatus comprising: a light source; a projection lens; a projection gate having an opening therethrough aligned with said lens and light source; an optically clear endless supporting belt; means for controllably moving said belt over said projection gate; a plurality of film slide mounts individually supported on said belt forwardly of their transverse center line so that the trailing edges of the mounts are free to swing away from the belt in the straight line movement thereof, said mounts having a permanent curvature longitudinally of the belt; a film transparency mounted in each slide mount so as to take the curvature thereof to give the film physical stability against positional distortion under the heat of said light source; a screen upon which the film image is projected, said screen having a curvature substantially optically concentric with the curvature of a slide mount and film in projection position, said belt moving means including rotary supporting means accommodating the curvature of the slide mounts thereagainst.

References Cited by the Examiner

UNITED STATES PATENTS

| | | | |
|---|---|---|---|
| 1,489,510 | 4/1924 | Stromberg | 88—24 |
| 1,590,704 | 6/1926 | Semelroth | 40—152 |
| 1,856,234 | 5/1932 | Birdsall | 88—28 |
| 1,868,722 | 7/1932 | Birdsall | 88—24 |
| 2,265,992 | 12/1941 | Beck | 88—24 |
| 2,290,287 | 7/1942 | Links et al. | 352—104 |
| 2,438,137 | 3/1948 | Waller et al. | 88—24 |
| 2,479,553 | 8/1949 | Boecking | 352—228 X |
| 2,520,410 | 8/1950 | Jelinek | 352—126 X |
| 3,219,406 | 11/1965 | Arvis | 352—233 |

FOREIGN PATENTS 5,306 of 1902 Great Britain.

JOHN M. HORAN, *Primary Examiner.*

WILLIAM MISIEK, NORTON ANSHER, *Examiners.*

HAROLD H. FLANDERS, VANCE A. SMITH,
                           *Assistant Examiners.*